United States Patent
Carter et al.

(10) Patent No.: US 9,250,776 B2
(45) Date of Patent: Feb. 2, 2016

(54) MAXIMIZING INFORMATION CONSUMPTION IN EMBEDDED EXPERIENCE APPS/POP-UPS AND NEWSFEED/ACTIVITY STREAMS

(71) Applicant: International Business Machines Corporation, Armonk, NY (US)

(72) Inventors: Bernadette A. Carter, Raleigh, NC (US); Al Chakra, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 252 days.

(21) Appl. No.: 13/909,407

(22) Filed: Jun. 4, 2013

(65) Prior Publication Data

US 2014/0359474 A1   Dec. 4, 2014

(51) Int. Cl.
*G06F 3/0484* (2013.01)
*G06F 17/21* (2006.01)
*G06Q 50/00* (2012.01)

(52) U.S. Cl.
CPC .......... *G06F 3/04842* (2013.01); *G06F 17/218* (2013.01); *G06Q 50/01* (2013.01)

(58) Field of Classification Search
CPC ... G06F 9/4443; G06F 3/0481; G06F 17/218; G06F 17/24; G06Q 50/01; H04L 51/32
USPC ....................................................... 715/747
See application file for complete search history.

(56) References Cited

U.S. PATENT DOCUMENTS

| | | | |
|---|---|---|---|
| 2005/0177385 A1* | 8/2005 | Hull ........................ | G06Q 10/10 705/319 |
| 2008/0244381 A1* | 10/2008 | Nicolaou ............ | G06F 17/2745 715/234 |
| 2011/0178996 A1* | 7/2011 | Pendlebury et al. .......... | 707/692 |
| 2012/0151383 A1 | 6/2012 | Kazan et al. | |
| 2013/0073971 A1* | 3/2013 | Huang ................... | G06Q 50/01 715/738 |
| 2014/0089816 A1* | 3/2014 | DiPersia ................ | G06Q 50/01 715/753 |

FOREIGN PATENT DOCUMENTS

CA       EP 2 362 307 A1 *   8/2011   ................ G06F 9/44

OTHER PUBLICATIONS

Authors et. al.: Disclosed AnonymouslyIBM, Method for deleting or mark deleted includable and redundant content in email Systems, Original Publication Date: Aug. 25, 2008, IP.com Electronic Publication, IP.com No. 000173880, pp. 2-3.*

Authors et. al.: Disclosed Anonymously, System, Method and Computer Program Product for Avoiding Redundant Presentation of Content, Apr. 28, 2006, IP.com Electronic Publication, IP.com No. 000135940, pp. 8, 10, 16.*

* cited by examiner

*Primary Examiner* — Alvin Tan
(74) *Attorney, Agent, or Firm* — Scully, Scott, Murphy & Presser, P.C.

(57) ABSTRACT

A system, method and computer program product for controlling information to be displayed on a display device may be provided. The system may display on a first display view, electronic data which includes interactable data. The system may detect that the interactable data is selected by a user. The system may identify redundant data between the electronic data and content to be rendered responsive to selecting the interactable data. The system may hide the identified redundant data from the content to be rendered or the original content of the electronic data. The system may display, on a second display view, the content without the identified redundant data.

18 Claims, 8 Drawing Sheets

MAXIMIZING INFORMATION CONSUMPTION IN EMBEDDED EXPERIENCE APPS/POP-UPS AND NEWSFEED/ACTIVITY STREAMS

FIELD

This disclosure relates generally to computers and computer applications, and more particularly to controlling information to be displayed on a display device.

BACKGROUND

Embedded Experience (EE) applications or pop-up windows are designed to give users an enhanced user experience by allowing them to see content and perform actions in a second display view while still being able to view data displayed on a first display view. An Embedded Experience application refers to a software application which is embedded in another software application.

SUMMARY

A system, a method and a computer program product may be provided for controlling information to be displayed on a display device. The system displays, on a first display view, electronic data which includes interactable data. The system detects that the interactable data is selected by a user. The system identifies redundant data between the electronic data and content to be rendered responsive to selecting the interactable data. The system removes the identified redundant data from the content to be rendered. The system displays, on a second display view, the content without the identified redundant data.

The system removes the redundant data from the electronic data. The system displays, on the first display view, the electronic data without the redundant data. The system displays, on the second display view, the content with the redundant data. The system receives new data from one or more computing systems. The system displays, on the first display view, the received new data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Currently, data displayed in an embedded experience application or a pop-up window may include redundant data which is also displayed outside of the embedded experience application or the pop-up window. An application or object is considered to be "embedded" in another application or object if the former application or object can be called, invoked or linked within or otherwise accessible from the latter application or object. Since a display screen of a display device is limited, a computing system may allow the embedded experience application or the pop-up window to play a complementary role to content that is already visible in a first display view. By removing the redundant data in the embedded experience application or the pop-up window, the computing system can maximize the amount of content that is presented on the display screen. The computing system may modify data displayed on the first display view to remove the redundant data when the embedded experience application or the pop-up window with the redundant data is visible to the user in order to maximize the amount of data displayed in the first display view.

Figure 1:
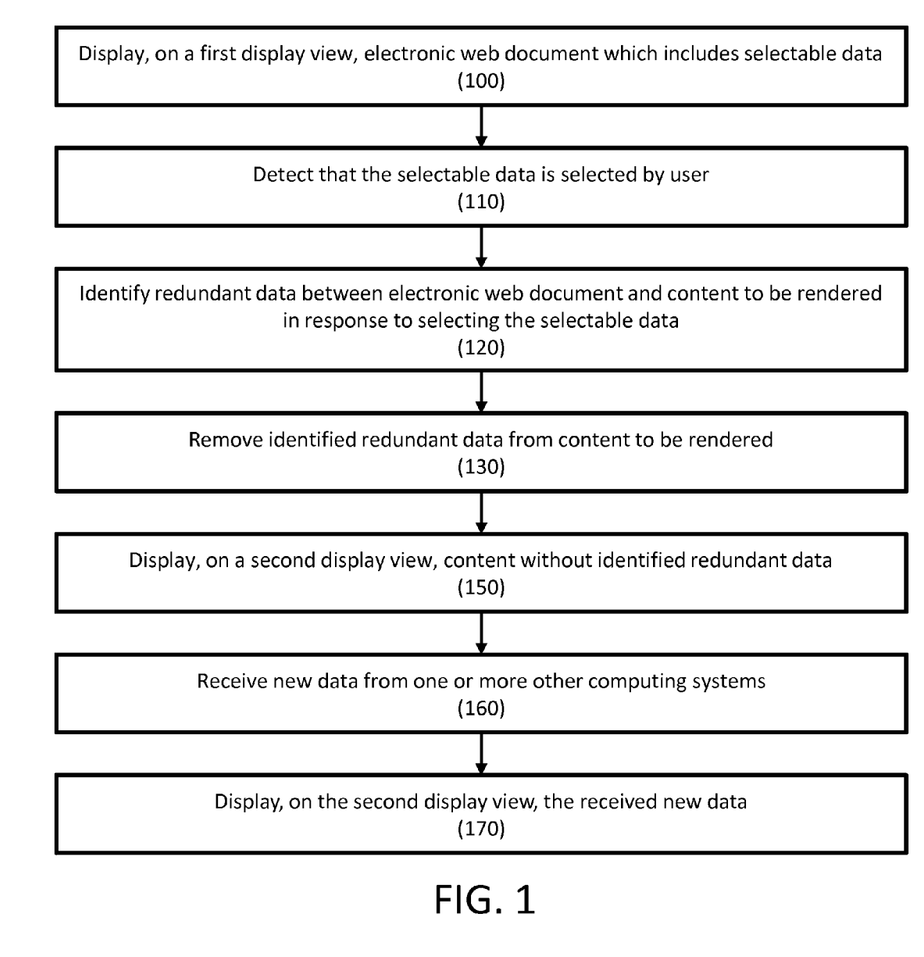
FIG. 1 illustrates a flowchart that describes a method for controlling information to be displayed on a display device in one embodiment.
Figure 2:
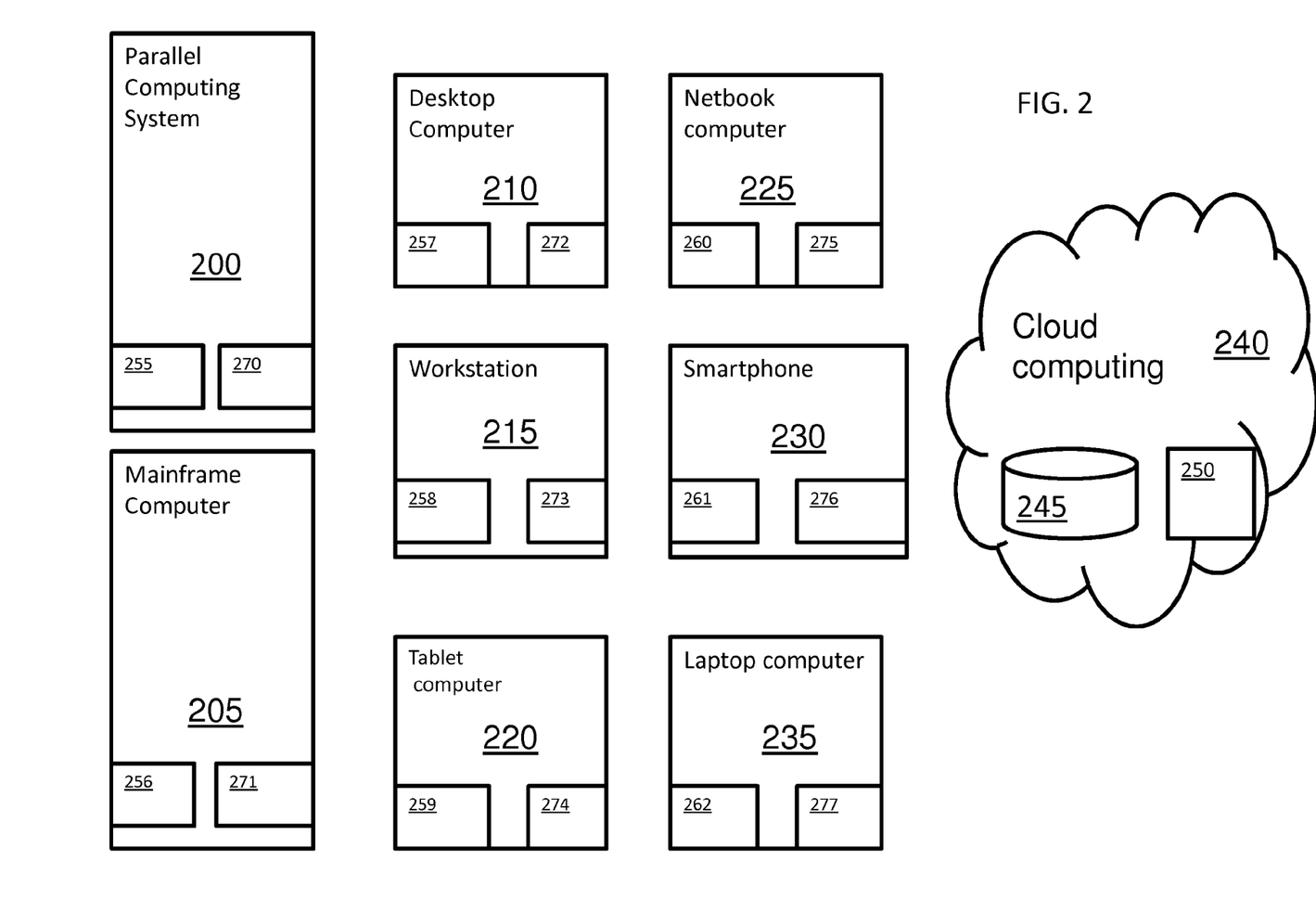
FIG. 2 illustrates examples of a computing system that can run the methods illustrated in FIGS. 1 and 3-4.

There is provided a system, a method, and a computer program product for controlling information to be displayed on a display device. FIG. 1 illustrates a method for controlling information to be displayed on a display device in one embodiment. In one embodiment, a computing system may run the method illustrated in FIG. 1. FIG. 2 illustrates examples of the computing system. An example computing system may include, but are not limited to: a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 259 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, or a cloud computing system 240 including at least one storage device 245 and at least one server device 250.

Returning to FIG. 1, at 100, the computing system receives electronic data which includes interactable data. The electronic data may include, but is not limited to: one or more web feeds, an electronic document written in a software programming language or a natural language, a software application, or any combination thereof. The computing system displays, on the first display view, the electronic data which includes interactable data. Interactable data may include, but is not limited to: data, when interacted with, which may result in additional related data being presented or displayed. Example of interactable data may include one or more of: (1) a pop-up window data; (2) embedded experience application data; (3) an object to be displayed on a second display view (e.g., a pop-up window, etc.); or (4) combination thereof. At 110, the computing system detects that the interactable data is selected by a user, e.g., through a click of a mouse device or by any similar input mechanism.

At 120, the computing system compares the content of the electronic data and the content to be rendered in response to the selection of the interactable data. For example, in order to compare the content of an electronic web document and the content to be rendered, the computing system compares, e.g., by running a text comparison tool which compares two electronic documents, content of an electronic web document displayed on the first display view and the content to be rendered. Based on the comparison, the computing system identifies redundant data between the content of the electronic data and the content to be rendered in response to selecting the interactable data. In one embodiment, in order to identify the redundant data, the computing system performs a content analysis on the content to be rendered to determine what types of data are being rendered in each section of that content to be rendered. Then, the computing system matches each section of that content to one or more of a corresponding user's setting. The redundant data in that content may include, but are not limited to: similar content displayed on the first display view, contents determined based on the user's preference (e.g., the user may enter in the computing system what contents (s)he does not want to see), content determined based on the user's feedback (e.g., the user might have entered his/her feedback of prior contents displayed on the second display view to the computing system), contents determined based on the user's instruction (e.g., the user may specify, in the computing system, what contents to be hidden on the second display view).

At 130, the computing system removes the identified redundant data from the content to be rendered, e.g., by hiding the redundant data from the content to be rendered. At 150, the computing system displays, on the second display view, the content without the identified redundant data. The second display view includes, but is not limited to: a pop-up window or any other similar display view.

At 160, the computing system receives new data from one or more other computing systems. The received new data may include, but are not limited to: new data or one or more new web feeds, each of which is not available in the electronic data and not available in an original content to be rendered in response to the selection of the interactable data, for example, one or more web feeds newly entered by other users after the electronic data has been displayed to the user. At 170, the computing system displays, on the second display view, the received new data. In one embodiment, in order to receive new data and display or hide (if e.g., redundant information) the received new data on the second display view, the computing system performs a content analysis on the content to be rendered to determine what types of data are being rendered in each section of that content and then hides (if e.g., redundant information) or adds additional data to the content to be rendered based on one or more match of a corresponding user's interest. The additional data may include, but are not limited to: similar content displayed on the first display view, contents determined based on the user's preference (e.g., the user may enter his/her preference of contents to the computing system), content determined based on the user's feedback (e.g., the user might have entered his/her feedback of prior additional data to the computing system), contents determined based on the user's instruction (e.g., the user may specify, in the computing system, what contents to be displayed as the additional data).

The computing system filters the content to be rendered in the second display view based on what is visible on the first display view, e.g., by removing the identified redundant data from the content to be rendered. The computing system marks, e.g., by using an electronic graphical indication or similar technique, etc., the identified redundant data in the electronic data. The computing system displays, on the first display view, the electronic data that includes the marked redundant data. In one embodiment, the computing system optimizes the way to remove the identified redundant data based upon one or more aspects of: (1) a preferred area, in the display screen of the display device, where a corresponding user normally interacts with the most with the computing system or (2) a screen real estate of the display device (e.g., minimizing vertical or horizontal screen real estate required based upon screen real estate limitation of the display device). In one embodiment, there is provided a configuration setting to the user to enable the user to choose one of: (1) removing the redundant data upon identifying redundant data between the content to be rendered and the electronic data; (2) displaying the original content to be rendered and the original electronic data to the user—this setting does not identify the redundant data and does not modify the content to be rendered and does not modify the electronic data.

Figure 3:
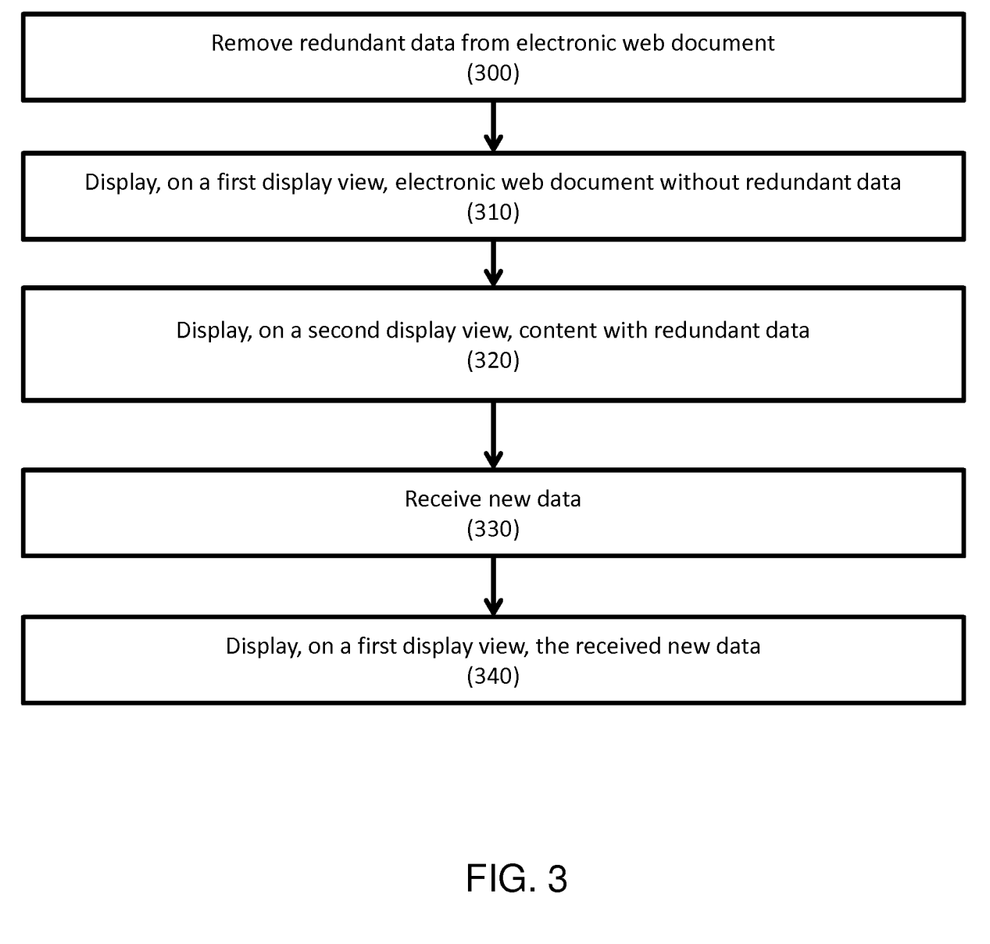
FIG. 3 illustrates a method for maximizing information to be displayed on a display device in one embodiment.
Figure 4:
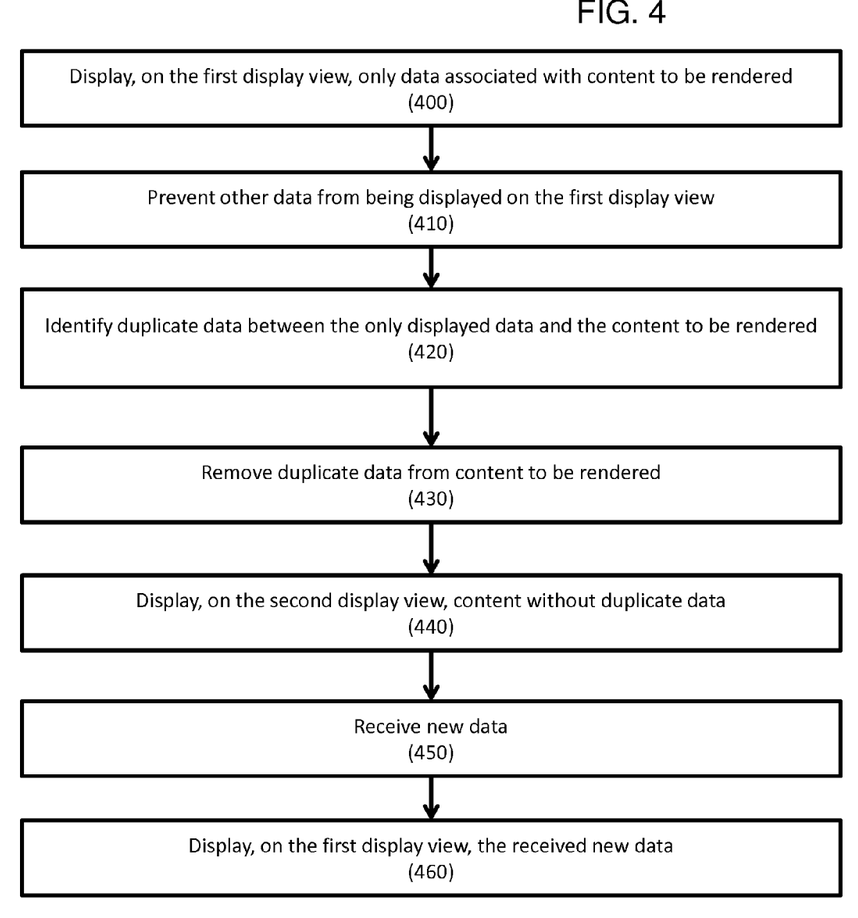
FIG. 4 illustrates a method for maximizing information to be displayed on a display device in another embodiment.

If the user chooses the second configuration setting, the computing system displays the original content to be rendered in response to the selection of the interactable data. If the user chooses the first configuration setting, the computing system runs the method shown in FIG. 1, FIG. 3 or FIG. 4. (FIGS. 3-4 are described in detail below.) For example, consider a following example usage scenario that can occur upon the choice of the first configuration. One or more other users have commented on and recommended a file. The computing system displays, on the first display view, the comments and recommendations. The computing system displays, on the second display view, comments or recommendations received immediately before or after the comments displayed on the first display view. Consider another example usage scenario that can occur upon the choice of the first configuration. One or more other users have recommended a file. Data entries that correspond to these recommendations are displayed on the first display view. The computing system displays, on the first display view, names of some of the other users that have recommended the file. The computing system displays, on the second display view, names of the other users not already displayed on the first display view.

FIG. 3 illustrates a flowchart that describes a method for maximizing information to be displayed on the display device in a further embodiment. At 300, after identifying the redundant data between the content of the electronic data and the content to be rendered in response to the selection of the interactable data, the computing system removes the identified redundant data from the electronic data. In order to remove the redundant data from the content of the electronic data, the computing system (1) hides the redundant data in the electronic data; (2) shrinks the redundant data in the electronic data; and/or (3) de-emphasize, e.g., compresses, the redundant data in the electronic data. For example, if the redundant data is an image, the computing system may reduce the image size. Alternatively, the computing system may hide the image in the electronic data. At 310, the computing system displays, on the first display view, the electronic data without the identified redundant data. At 320, the computing system displays, on the second display view, the content with the identified redundant data. At 330, the computing system receives new data from one or more other computing systems. At 340, the computing system displays, on the first display view, the received new data. If the computing system detects that the user closes the second display view, the computing system may display, on the first display view, the electronic data with the identified redundant data. The computing system may not display, on the first display view, the received new data if the computing system detects that the user closes the second display view.

FIG. 4 illustrates a flowchart that describes a method for maximizing information to be displayed on the display device in a further embodiment. When the user selects the interactable data on the electronic data, at 400, the computing system displays, on the first display view, only data associated with the content to be rendered in response to the selection. At 410, the computing system prevents other data (i.e., data not associated with the interactable data) from being displayed on the first display view. For example, the computing system may hide the other data on the first display view. At 420, the computing system identifies duplicate data between the data displayed on the first display view and the content to be rendered, e.g., by comparing the data displayed on the first display view and the content to be rendered. At 430, the computing system removes the duplicate data from the content to be rendered on the second display view. For example, in order to remove the duplicate data from the content to be rendered, the computing system hides, shrinks or compresses the duplicate data. At 440, the computing system displays, on the second display view, the content to be rendered without the duplicate data. At 450, the computing system receives new data, e.g., new web feeds. At 460, the computing system displays, on the first display view, the received new data. By displaying the received new data on the first display view, the computing system can maximize information to be displayed on the first display view and the second display view.

By running methods shown in FIG. 3, in order to increase amount of data to be displayed on the display device, the computing system may modify data displayed on the first display view when the computing system displays, on the second display view, the content to be rendered with the redundant data. For example, when both the first display view and the second display view display the same image, the computing system may shrink, hide or compress the image to be displayed on the first display view or the second display view. The computing system may display new data on an area, on the first display view or the second display view, which becomes available after shrinking, hiding or compressing the image.

As another example, when the user selects the interactable data in the electronic data, the computing system identifies redundant data between data displayed on the first display view and content to be rendered upon the selection of the interactable data. The computing system displays, on the second display view, the identified redundant data. The computing system may shrink, hide or de-emphasize the identified redundant data on the first display view in order to free up areas on the first display view to display additional new data on the first display view while the second display view is open.

As another example, assume that the computing system displays, on the first display view, multiple data entries related to the same item. Further assume that the computing system detects that the user selects one of the data entries on the first display view. Further assume that the content to be rendered upon the selection of the one of the data entries includes all the entries displayed on the first display view. In this example, the computing system may hide or de-emphasize, on the first display view, all the entries except the selected data entry while the second display view displays all the data entries. On areas of the first display view that become available by hiding or de-emphasizing all the data entries except the selected data entry, the computing system may display additional new data entries.

In one embodiment, after the user selects the interactable data on the electronic data, the computing system de-emphasizes or filters the content to be rendered on the second display view based on an available area of the second display view and further based on data already presented on the first display view. For example, by removing the redundant data from the content to be rendered upon the selection of the interactable data in the electronic data, the computing system may add new data, e.g., new web feeds, to the available area(s) which includes an area that would have been used to present the redundant data.

In one embodiment, the computing system displays the electronic data which includes a plurality of data entries, e.g., a plurality of news feeds. When the user selects one of those data entries, the computing system displays, on the first display view, only the selected entry and hides other data entries on the first display view, e.g., by automatically hiding the other data entries from the electronic data. The computing system receives new data, e.g., new web feeds, from other computing system(s). The computing system would display the received new data on the first display view while displaying, on the second display view, content rendered upon the selection of the interactable data. The content rendered on the second display view may include one or more data entries originally presented on the electronic data, e.g., by adding additional data, which correspond to the one or more data entries, to the content to be rendered.

Figure 5:
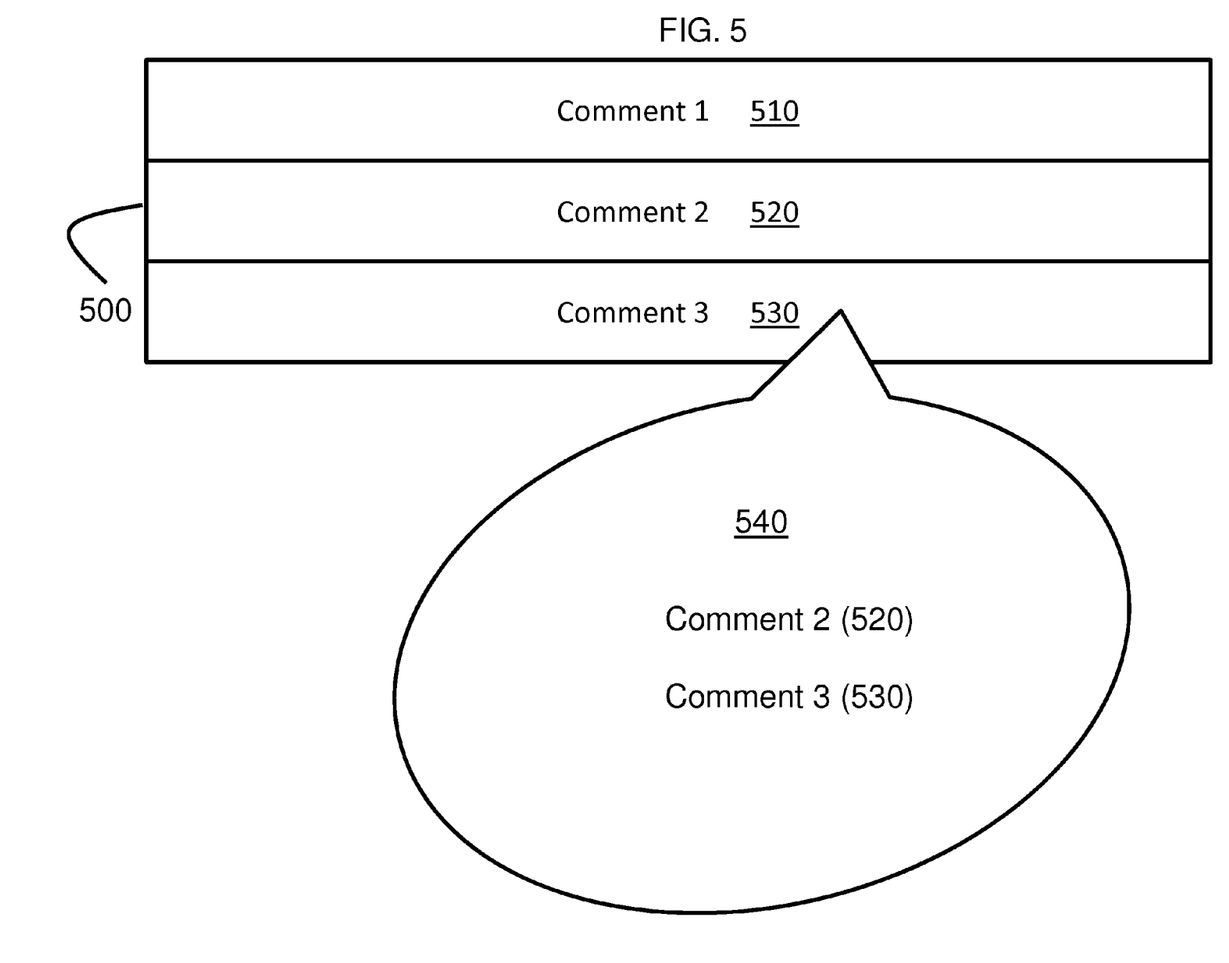
FIG. 5 illustrates an example of a traditional pop-up window.

FIG. 5 illustrates that an example first display view 500 and an example traditional second display view 540. The electronic data 500 includes three interactable comments 1-3 (510-530), e.g., three interactable news feed events or notifications. The traditional second display view 540 includes two redundant comments 2-3 (520-530). In FIG. 5, two redundant comments 2-3 (520-530) are displayed on first display view as well as the traditional second display view 540.

Figure 6:
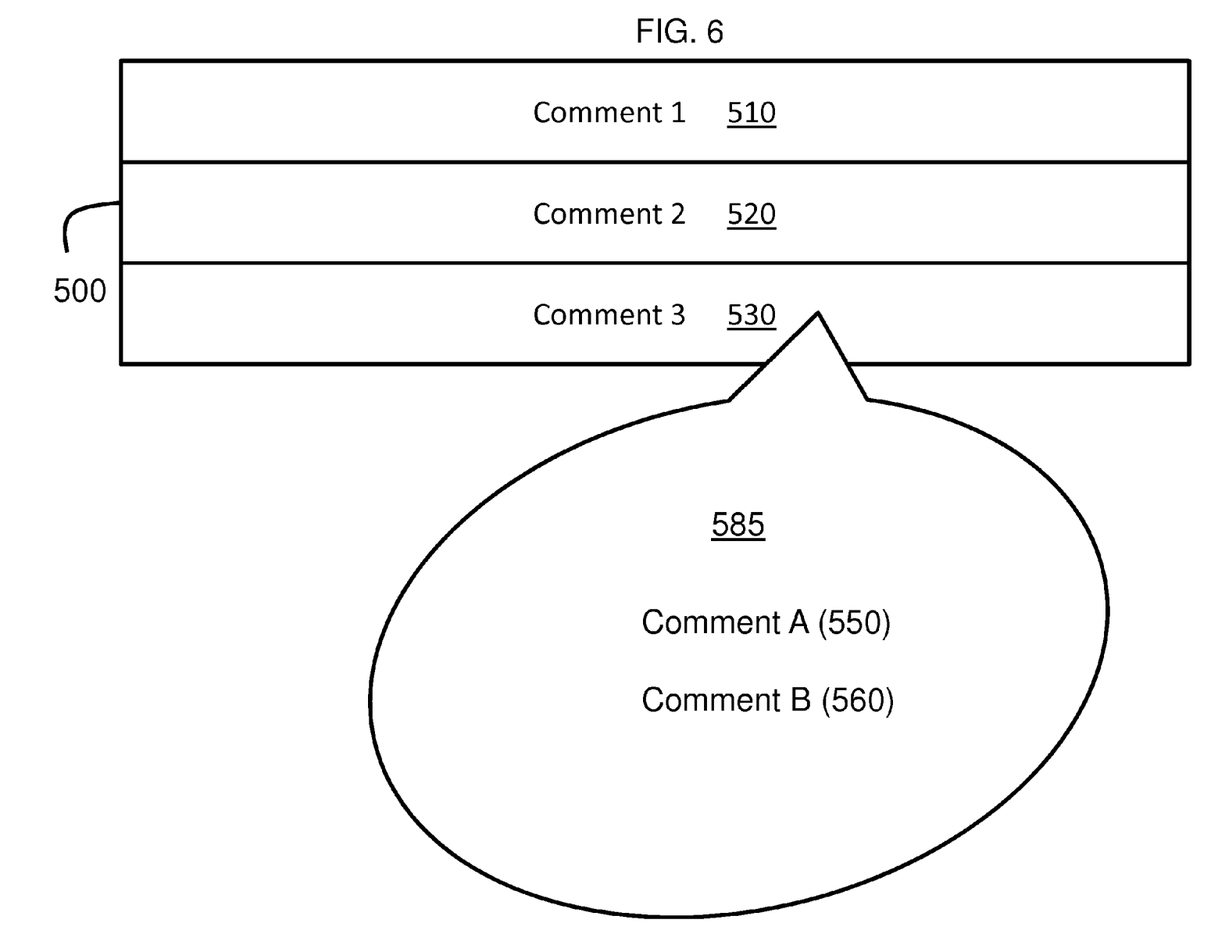
FIG. 6 illustrates an example pop-up window that utilizes the method shown in FIG. 1 in one embodiment.
Figure 7:
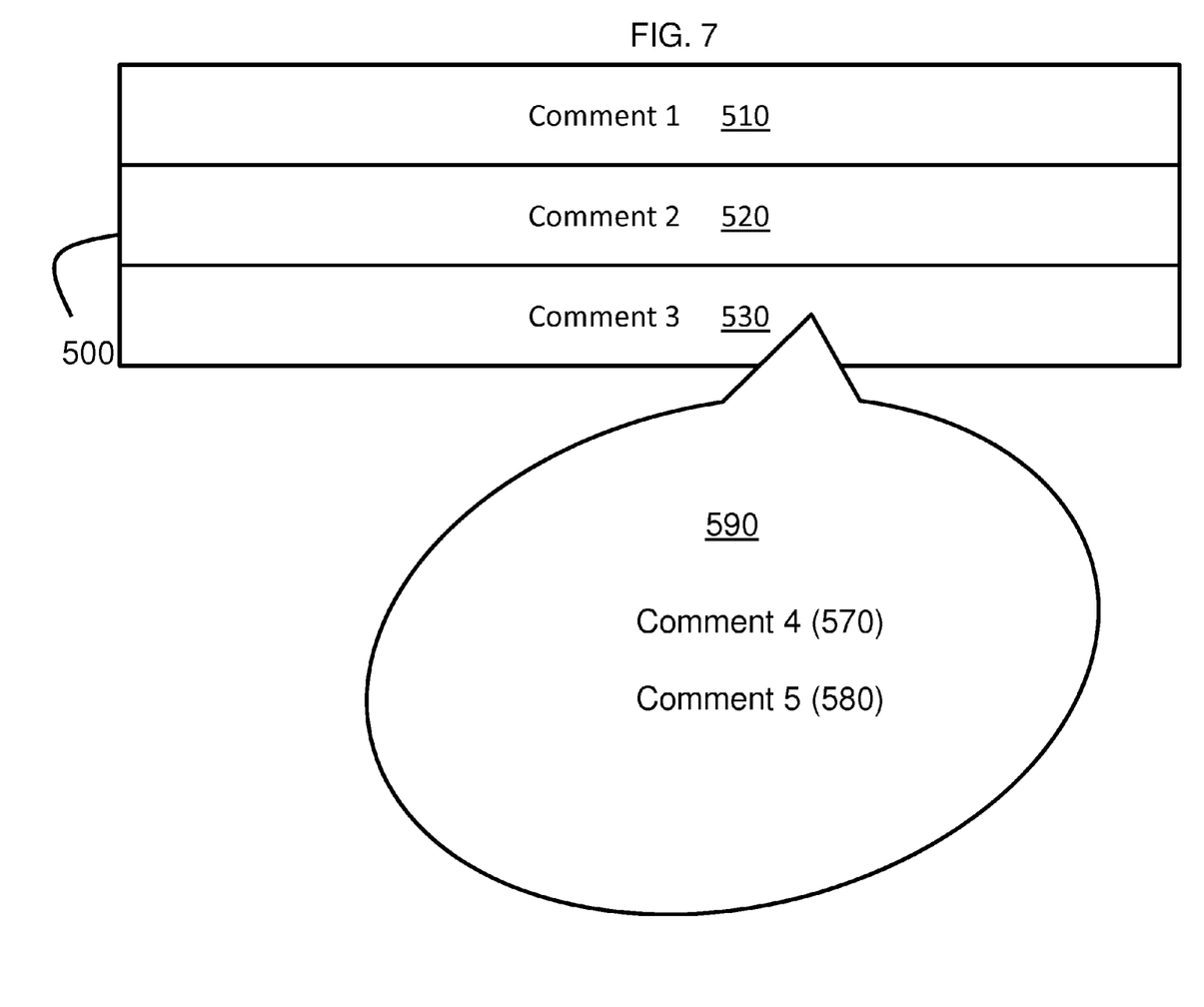
FIG. 7 illustrates an example pop-up window that utilizes the method shown in FIG. 1 in another embodiment.

FIG. 6 illustrates the example first display view 500 and an example second display view 585 in one embodiment. Once the computing system identifies the redundant comments between the first display view 500 and the content to be rendered 540 shown in FIG. 5, the computing system removes the identified redundant comments 2-3 (520-530) from the content to be rendered on the second display view. The computing system adds a couple of previous comments A-B (550-560) to the content to be rendered on a second display view 585. The previous comments A-B (550-560) refer to herein comments received prior to the comments 1-3 (510-530). FIG. 7 illustrates the example first display view 500 and an example second display view 590 in one embodiment. Once the computing system identifies the redundant comments between the first display view 500 and the content to be rendered 540 shown in FIG. 5, the computing system removes the identified redundant comments 2-3 (520-530) from the content to be rendered on the second display view. The computing system adds a couple of comments 4-5 (570-580) to the content to be rendered on the second display view 590. The comments 4-5 (570-580) refer to herein comments received after the comments 1-3 (510-530) are displayed on the first display view 500. In an alternative embodiment, in FIG. 5, when displaying the second display view 540, the computing system may remove comments 2-3 (520-530) from the first display view 500 and may display, on the second display view 540, the comments 2-3 (520-530).

Figure 8:
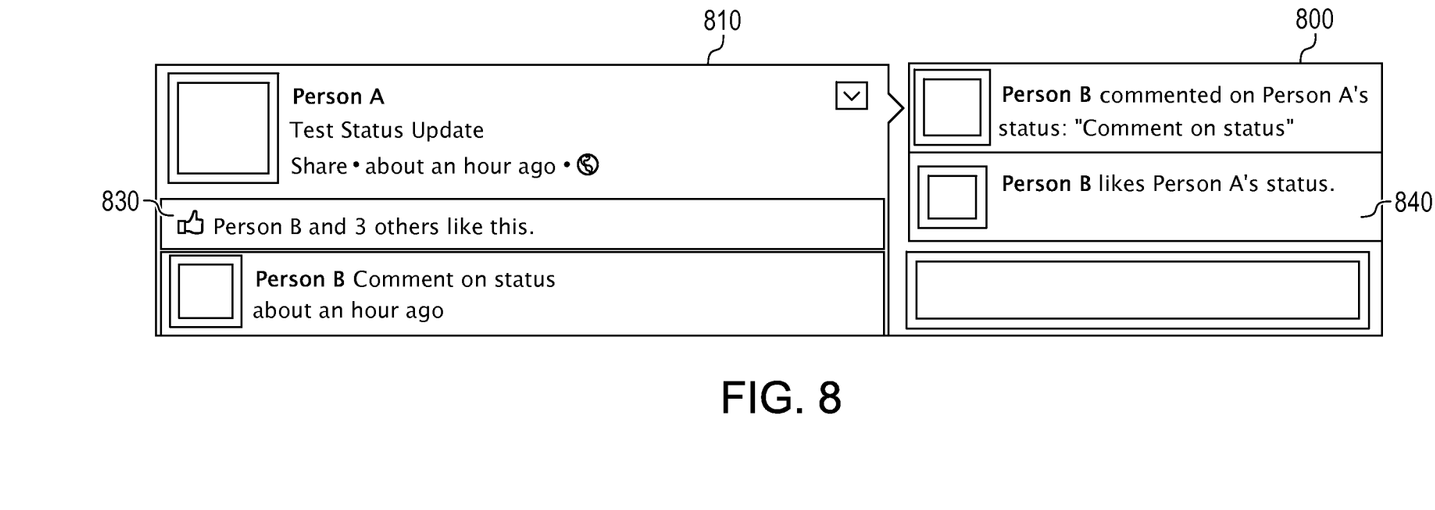
FIG. 8 illustrates an example of another traditional pop-up window.

FIG. 8 illustrates an example first display view 800 and a traditional example second display view 810. Note that the example first display view 800 displays, "Person B likes Person A' status" comment 840. The traditional example second display view 810 displays, "Person B and 3 others like this" comment 830. By running the method shown in FIG. 3, the computing system may remove the "Person B likes Person A's status" comment 840 from the first display view 800 while the second display view 810 displays the comment 830. The computing system may add additional comments to the first display view 800 in order to maximize information displayed on a screen of the display device. Alternatively, the computing system may merge the comment 830 and the comment 840, e.g., by displaying only one of the comments 830-840 on the first display view 800, while the second display view 810 is opened.

In one embodiment, the methods shown in FIGS. 1 and 3-4 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1 and 3-4 may be implemented on a semiconductor chip, e.g., ASIC (Application-Specific Integrated Circuit), by using a semi custom design methodology, i.e., designing a semiconductor chip using standard cells and a hardware description language.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™ C++ or the like and conventional procedural programming languages, such as the "C" programming language or similar programming languages. The program code may run, as a stand-alone software package, entirely on the user's computer, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method for controlling information to be displayed on a display device, the method comprising:
  displaying, on a first display view, electronic data which comprises interactable data;
  detecting that the interactable data is selected by a user;

identifying redundant data between the electronic data displayed on the first display view, and content to be rendered responsive to selecting the interactable data;
removing the identified redundant data from the content to be rendered;
displaying, on a second display view, the content without the identified redundant data; and
marking with a graphical rendering on the first display view, a portion of the electronic data displayed on the first display view, the portion that corresponds to the identified redundant data, the first display view and the second display view displayed together on the display device,
wherein a processor coupled to a memory device perform: the displaying the electronic data, the detecting, the identifying, the removing, the displaying the content, and the marking.

2. The method according to claim 1, further comprising:
receiving new data from one or more computing systems; and
displaying, on the second display view, the received new data.

3. The method according to claim 2, wherein the new received data comprises:
one or more new web feeds or new data, each of which is not available in the electronic data and not available in the content to be rendered.

4. The method according to claim 1, wherein the electronic data comprises:
one or more web feeds or a group of data.

5. The method according to claim 1, wherein the interactable data comprises one or more of:
a pop-up window data, embedded experience application data, or an additional data to be displayed.

6. The method according to claim 1, wherein the electronic data comprises:
an electronic document or a software application.

7. The method according to claim 1, further comprising:
removing the redundant data from the electronic data;
displaying, on the first display view, the electronic data without the redundant data;
displaying, on the second display view, the content with the redundant data;
receiving new data from one or more computing systems; and
displaying, on the first display view, the received new data.

8. The method according to claim 7, wherein the removing the redundant data from the electronic data comprises one or more of:
hiding the redundant data in the electronic data;
shrinking the redundant data in the electronic data; or
de-emphasizing the redundant data in the electronic data.

9. The method according to claim 7, further comprising:
detecting that the user closes the second display view; and
displaying, on the first display view, the redundant data.

10. The method according to claim 1, further comprising:
displaying, on the first display view, only data associated with the content to be rendered;
preventing other data from being displayed on the first display view;
identifying duplicate data between the only displayed data and the content to be rendered;
removing the duplicate data from the content to be rendered;
displaying, on the second display view, the content without the duplicate data;
receiving new data from one or more computing systems; and
displaying, on the first display view, the received new data.

11. A system for controlling information to be displayed on a display device, the system comprising:
a memory device;
a processor coupled to the memory device, wherein the processor is configured to perform:
displaying, on a first display view, electronic data which comprises interactable data;
detecting that the interactable data is selected by a user;
identifying redundant data between the electronic data displayed on the first display view, and content to be rendered responsive to selecting the interactable data;
removing the identified redundant data from the content to be rendered;
displaying, on a second display view, the content without the identified redundant data; and
marking with a graphical rendering on the first display view, a portion of the electronic data displayed on the first display view, the portion that corresponds to the identified redundant data, the first display view and the second display view displayed together on the display device.

12. The system according to claim 11, wherein the processor is further configured to perform:
receiving new data from one or more computing systems; and
displaying, on the second display view, the received new data.

13. The system according to claim 11, wherein the processor is further configured to perform:
removing the redundant data from the electronic data;
displaying, on the first display view, the electronic data without the redundant data;
displaying, on the second display view, the content with the redundant data;
receiving new data from one or more computing systems; and
displaying, on the first display view, the received new data.

14. The system according to claim 13, wherein the processor is further configured to perform:
detecting that the user closes the second display view; and
displaying, on the first display view, the redundant data.

15. The system according to claim 11, wherein the processor is further configured to perform:
displaying, on the first display view, only data associated with the content to be rendered;
preventing other data from being displayed on the first display view;
identifying duplicate data between the only displayed data and the content to be rendered;
removing the duplicate data from the content to be rendered;
displaying, on the second display view, the content without the duplicate data;
receiving new data from one or more computing systems; and
displaying, on the first display view, the received new data.

16. A computer program product for controlling information to be displayed on a display device, the computer program product comprising a non-transitory computer readable storage medium readable by a machine and storing instructions run by the machine to perform a method, said method comprising:
displaying, on a first display view, electronic data which comprises interactable data;

detecting that the interactable data is selected by a user;

identifying redundant data between the electronic data displayed on the first display view, and content to be rendered responsive to selecting the interactable data;

removing the identified redundant data from the content to be rendered;

displaying, on a second display view, the content without the identified redundant data; and marking with a graphical rendering on the first display view, a portion of the electronic data displayed on the first display view, the portion that corresponds to the identified redundant data, the first display view and the second display view displayed together on the display device.

17. The computer program product according to claim 16, wherein the method further comprises:

removing the redundant data from the electronic data;

displaying, on the first display view, the electronic data without the redundant data;

displaying, on the second display view, the content with the redundant data;

receiving new data from one or more computing systems; and displaying, on the first display view, the received new data.

18. The computer program product according to claim 16, wherein the method further comprises:

displaying, on the first display view, only data associated with the content to be rendered;

preventing other data from being displayed on the first display view;

identifying duplicate data between the only displayed data and the content to be rendered;

removing the duplicate data from the content to be rendered;

displaying, on the second display view, the content without the duplicate data;

receiving new data from one or more computing systems; and displaying, on the first display view, the received new data.

* * * * *